United States Patent [19]
Petio et al.

[11] Patent Number: 5,645,772
[45] Date of Patent: Jul. 8, 1997

[54] REFRACTORY CERAMIC MASS FOR LINING THE BOTTOMS OF ELECTRIC ARC FURNACES AND PROCESS FOR THEIR REPAIR

[75] Inventors: Franz-Adolf Petio, Leoben; Wilfried Eckstein, Trofaiach, both of Austria

[73] Assignee: Veitsch-Radex Aktiengesellschaft fur Feuerfeste Erzeugnisse, Vienna, Australia

[21] Appl. No.: 367,135
[22] PCT Filed: Jun. 15, 1993
[86] PCT No.: PCT/EP93/01506
§ 371 Date: Dec. 23, 1994
§ 102(e) Date: Dec. 23, 1994
[87] PCT Pub. No.: WO94/00400
PCT Pub. Date: Jan. 6, 1994

[30] Foreign Application Priority Data
Jun. 26, 1992 [DE] Germany ............... 42 21 101.8

[51] Int. Cl.⁶ ............... B32B 35/00; C04B 35/04; C21B 7/06; F27D 1/16
[52] U.S. Cl. ............... 264/30; 264/36; 266/281; 427/140; 501/112
[58] Field of Search ............... 501/112; 264/30, 264/35, 36; 427/140; 156/94; 266/281; 425/11–13

[56] References Cited

U.S. PATENT DOCUMENTS

| | | | |
|---|---|---|---|
| 1,934,263 | 11/1933 | Hacks et al. | 266/281 X |
| 2,133,329 | 10/1938 | Moore et al. | 266/281 X |
| 2,206,277 | 3/1940 | Crespi | 266/281 X |
| 2,451,679 | 10/1948 | Komorowski | 266/281 |
| 2,504,185 | 4/1950 | Debenham | 266/281 X |
| 3,959,001 | 5/1976 | Clasen et al. | 501/112 |
| 4,471,059 | 9/1984 | Yoshino et al. | |
| 4,696,456 | 9/1987 | Denier et al. | 266/281 X |
| 4,779,846 | 10/1988 | Denier et al. | 264/30 X |
| 4,780,434 | 10/1988 | Watanabe et al. | 501/112 X |
| 5,128,075 | 7/1992 | Robyn et al. | 264/36 X |

FOREIGN PATENT DOCUMENTS

| | | | |
|---|---|---|---|
| 0494123 | 7/1992 | European Pat. Off. | |
| 55-90467 | 7/1980 | Japan | |
| 58-179535 | 10/1983 | Japan | |
| 4139057 | 5/1992 | Japan | |
| 512199 | 6/1976 | U.S.S.R. | |
| 1310434 | 5/1987 | U.S.S.R. | 264/30 |

*Primary Examiner*—Karen Aftergut
*Attorney, Agent, or Firm*—John F. A. Early; John F. A. Earley, III

[57] ABSTRACT

A process for repairing bottom linings of D.C. arc furnaces. A refractory ceramic mass is used for lining the bottoms of D.C. arc furnaces in the area of metallic electrodes placed therein, wherein the refractory ceramic mass comprises one or more refractory oxides, in a grain fraction of less than 8 mm and 10 to 40 wt. % of finely dispersed metallic additives in a grain fraction of less than 0.1 mm, for lining bottoms of D.C. furnaces in the area of metallic electrodes, placed within said bottoms to insure an electrically conductive contact between the refractory ceramic mass and the metallic electrodes.

9 Claims, 1 Drawing Sheet

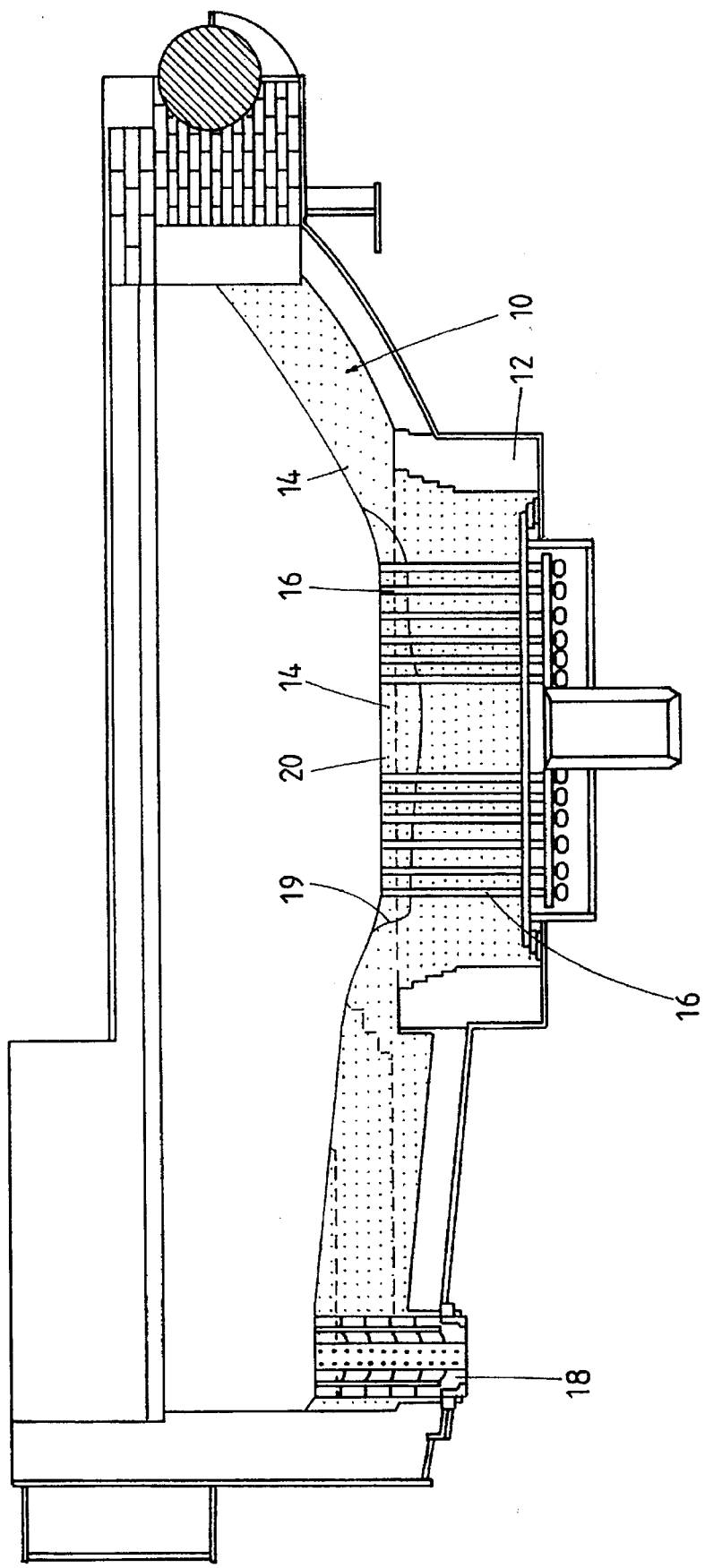

REFRACTORY CERAMIC MASS FOR LINING THE BOTTOMS OF ELECTRIC ARC FURNACES AND PROCESS FOR THEIR REPAIR

The present invention pertains to the use of a refractory ceramic mass for lining the bottoms of d.c. furnaces (direct-current electric furnaces), especially d.c. arc furnaces. One or more electrodes, which cooperate with one or more electrodes extending downward from the cover of the furnace to a point located a short distance in front of the area of the metal bath, are arranged in these furnaces. The present invention also pertains to a process for repairing the bottom linings of such furnaces.

Two types of d.c. electric arc furnaces have basically been known. In both cases, an electrode, usually the cathode, which may also be a multipart electrode, is arranged in the area of the furnace cover, and it extends to a point shortly in front of the metal bath.

In contrast, the lining of the counterelectrode (anode) differs. In one case, the bottom of the furnace is prepared completely with an electrically conductive, refractory ceramic lining, and thus it joins the metallic bottom electrode of the furnace, which is connected as the anode.

In the other case, the lining of the furnace bottom consists of conventional refractory bricks and masses, into which one or more separate electrodes extend.

The present invention pertains to the latter embodiment of DC furnaces.

It is obvious that it is very difficult to compact especially the area between the electrodes (anodes) in the bottom area of the furnace in the case of [ceramic] body linings. Consequently, wear will be more rapid precisely in this area than in adjacent sections of the bottom lining. Depending on the type and the extent of the erosion, the electrodes, which are normally covered by the refractory ceramic lining, will be exposed as well.

Repairing the refractory lining ([ceramic] mass) in this area is especially difficult because there is a risk of destruction or insulation of the electrodes. The complete lining (including the electrodes) has therefore hitherto been replaced, especially when the electrodes themselves have already been (partially) attacked (worn). This is difficult, and it costs a lot of money and time.

The present invention will remedy this situation and show a possibility of how the service life of bottom linings of d.c. furnaces can be prolonged.

The present invention is based on the consideration that the function of the electrode and consequently the durability of the bottom lining can be maintained or prolonged in a surprisingly simple manner by using a ceramic mass which makes electrical conductivity possible and thus ensures an electrically conductive contact with the metallic bottom electrodes, which are equally subject to wear, instead of a conventional, electrically nonconductive, refractory lining.

Even such ceramic masses have been known, in principle, for electric furnaces of the above-mentioned first design, in which the entire bottom is used as a counterelectrode, the prior-art ceramic linings do contain carbon, which is undesirable in many fields of application.

In contrast, the present invention proposes a refractory ceramic lining or repair mass, which is to be used in the area of the electrodes, and which contains 10 to 40 wt. % of finely dispersed metallic additives, besides one or more refractory ceramic oxides. These metallic additives preferably consist of iron.

The finely dispersed iron powder, which is homogeneously distributed in the refractory ceramic matrix, melts at ca. 1,400° C., and forms very fine channels, which are uniformly interspersed in the refractory ceramic matrix material, as a result of which sufficient electrical conductivity is also guaranteed in this area. Thus, the electrically conductive refractory ceramic mass also assumes a (partial) function of the bottom electrodes, which may have partially been already destroyed.

Even though ceramic a body consisting of refractory oxides and metal particles has been known from DATABASE WPI, Week 8348, Derwent Publications Ltd., AN 83-829648, it is used for molds for vacuum casting. The refractory oxides are said to be more finely dispersed than the iron particles. DATABASE WPI, Week 7704, Derwent Publications Ltd., AN 77-06997Y describes a jointing mortar, whose thermal conductivity is said to be improved by 8 to 15 wt. % of iron particles.

Linings based on sintered magnesite are frequently used currently as ceramic masses for lining the bottoms of prior-art d.c. electric arc furnaces. To achieve an overall homogeneous refractory lining of the furnace bottom, the present invention proposes, in an embodiment, the use of a refractory ceramic matrix material based on sintered magnesite. This ceramic material is preferably used in a grain fraction of <8 mm.

To optimize a homogeneous distribution, the metallic iron should be used in the most finely dispersed form possible, and a grain fraction of <0.1 mm is therefore provided in a special embodiment.

Even amounts of 20 to 30 wt. % relative to the total ceramic mass are sufficient to achieve homogeneous distribution of the iron in the ceramic mass. After the melting of the iron, a homogeneous network of iron channels, which ensure the desired conductivity in the area of the electrode, will thus be formed.

Since especially the bottom lining, which is located in the area of the electrodes, is usually subject to more rapid wear, it is usually also sufficient to subsequently line or repair only this area with the ceramic mass according to the present invention.

Consequently, the process according to the present invention for repairing the bottom linings of electric arc furnaces with one or more electrodes arranged in the bottom provides for the repair of the area of the lining eroded between the bottom electrodes with a ceramic mass of the above-described type.

The repair mass may be applied according to usual techniques, e.g., vibration or slight tamping.

A mass with ceramic bond, which is automatically formed under the application temperature, is preferably used.

The use of a ceramic mass containing finely dispersed metallic iron also offers the advantage that the ceramic mass has good sliding properties and consequently good processability, so that it can be introduced into the area between the electrodes more simply than a conventional, nonconductive refractory ceramic mass.

The use of the ceramic mass described offers the advantage that the bottom lining must be repaired on a relatively small section only, and, above all, the electrodes themselves can continue to be used. As a result, not only are costs saved, but the cost of repair in terms of both time and cost is markedly reduced.

The following specification can be given as an example for a ceramic mass to be used according to the present invention:

| | |
|---|---|
| MgO | 50–55 wt. % |
| Al$_2$O$_3$ | 0.1–0.5 wt. % |
| Fe$_2$O$_3$ | 1.7–2.5 wt. % |
| CaO | 12.5–14.5 wt. % |
| SiO$_2$ | 0.3–0.7 wt. % |
| Fe (metallic) | 25–35 wt. % |

This ceramic mass has a ceramic bond, and its maximum grain size is 5 mm. The bulk density of the ceramic material is ca. 2.6 g/cm$^3$. The limit of application of the said ceramic mass is ca. 1,750° C.

Other features of the present invention become apparent from the features of the subclaims as well as the other application documents.

The present invention will be explained in greater detail below on the basis of an exemplary embodiment.

The only figure shows a section of a d.c. electric furnace, in which the bottom as a whole is designated by the reference numeral 10. The bottom lining, which consists partly of refractory bricks 12 and partly of a refractory ceramic magnesite mass 14, is recognizable, and a plurality of electrodes 16 (anodes) are arranged in the said bottom 10. Some of the electrodes 16 are arranged at relatively closely spaced locations from one another.

The electrical connection elements, the counterelectrode (cathode), etc., are not represented here for the sake of greater clarity.

A discharge aperture 18, which is also irrelevant for the present invention and will not be explained in greater here, can also be recognized in the left-hand part of the figure.

Increased wear of the refractory (nonconductive) magnesite body takes place especially in the area of the electrodes in the course of the furnace operation. Such wear is indicated as an example by a broken line 19 in the figure.

After a maximum acceptable wear area has been reached, the ceramic lining 14 is repaired by relining the eroded area 20 around the electrodes, which are also partially worn in the upper section, with a new ceramic mass 14', which has the specification according to the present invention.

The ceramic mass can be readily applied even around the remaining (free) electrode heads and between them.

At the end of the repair, the bottom lining has the appearance shown in the figure. The furnace operation can then be resumed immediately.

The iron particles contained in the repair mass 14' ensure the electrical conductivity of the ceramic lining in the area of the electrode after melting.

Even when the repair mass 14' is also worn again, it is not necessary to replace the entire furnace lining (including the electrodes) as before; it is possible to perform a hew (another) repair, as was described above, which leads, all in all, to a severalfold increase in the service life of the bottom lining of such a d.c. electric furnace.

We claim:

1. Use of a refractory ceramic mass comprising
   a) one or more refractory oxides in a grain fraction of less than 8 mm and
   b) 10 to 40 wt. % relative to the refractory ceramic mass of finely dispersed metallic additives in a grain fraction of less than 0.1 mm for lining bottoms of d.c. furnaces in an area of metallic electrodes,
   wherein the refractory ceramic mass is placed within the area of the metallic electrodes to ensure an electrically conductive contact between the refractory ceramic mass and the metallic electrodes by formation of metallic channels in the refractory ceramic mass after melting of the finely dispersed metallic additives.

2. Use in accordance with claim 1, in which the one or more refractory oxides are those based on MgO.

3. Use in accordance with claim 1, in which the finely dispersed metallic additives occur in an amount between 20 and 30 wt. % relative to the refractory ceramic mass.

4. Use in accordance with claim 1, in which the metallic additives comprise iron.

5. Use in accordance with claim 1 in which, the refractory ceramic mass has a bulk density between 2.4 and 2.8 g/cm$^3$.

6. Use in accordance with claim 1, wherein the refractory ceramic mass is, a mass with ceramic bonding.

7. Process for repairing bottom linings of electric arc furnaces with one or more metallic electrodes arranged in the bottom linings, in which an area of the bottom linings eroded between the electrodes is replaced with a refractory ceramic mass comprising one or more refractory oxides and 10 to 40 wt. % of finely dispersed metallic additives relative to the refractory ceramic mass, and in which the refractory ceramic mass placed within the area of the metallic electrodes ensures an electrically conductive contact between the refractory ceramic mass and the metallic electrodes by formation of metallic channels in the refractory ceramic mass after melting of the finely dispersed metallic additives.

8. Use of a refractory ceramic mass consisting of
   a) one or more refractory oxides and
   b) finely dispersed metallic additives for lining bottoms of d.c. furnaces in an area of metallic electrodes,
   in which the one or more refractory oxides are those based on MgO,
   in which the one or more refractory oxides occur in a grain fraction of less than 8 mm,
   in which the finely dispersed metallic additives occur in a grain fraction of less than 0.1 mm,
   in which the finely dispersed metallic additives occur in an amount of 20 to 30 wt. % relative to the refractory ceramic mass,
   in which the metallic additives consist of iron,
   in which the refractory ceramic mass has a bulk density between 2.4 and 2.8 g/cm$^3$,
   in which the refractory ceramic mass is a mass with ceramic bonding, and
   in which the refractory ceramic mass placed within the area of the metallic electrodes ensures an electrically conductive contact between the refractory ceramic mass and the metallic electrodes by formation of metallic channels in the refractory ceramic mass after melting of the finely dispersed metallic additives.

9. Process for repairing bottom linings of electric arc furnaces with one or more metallic electrodes arranged in the bottom linings, in which an area of the bottom linings eroded between the electrodes is replaced with a refractory ceramic mass consisting of
   a) one or more refractory oxides and
   b) finely dispersed metallic additives for lining bottoms of d.c. furnaces in the area of the metallic electrodes,
   in which the one or more refractory oxides are those based on MgO,
   in which the one or more refractory oxides occur in a grain fraction of less than 8 mm,
   in which the finely dispersed metallic additives occur in a grain fraction of less than 0.1 mm, in which the finely dispersed metallic additives occur in an amount of 20 to 30 wt. % relative to the refractory mass, in which the metallic additives consist of iron, in which the refractory mass has a bulk density between 2.4 and 2.8 g/cm$^3$, in which the refractory ceramic mass is a mass with ceramic bonding, and in which the refractory ceramic mass placed within the area of the metallic electrodes ensures an electrically conductive contact between the refractory ceramic mass and the metallic electrodes by formation of metallic channels in the refractory ceramic mass after melting of the finely dispersed metallic additives.

* * * * *